United States Patent [19]

Fischer et al.

[11] 3,854,676

[45] Dec. 17, 1974

[54] RECORDING AND/OR PLAYBACK APPARATUS

[75] Inventors: Walter Fischer; Herbert Rutkowski, both of Vienna, Austria

[73] Assignee: U.S. Phillips Corporation, New York, N.Y.

[22] Filed: Oct. 19, 1972

[21] Appl. No.: 299,147

[30] Foreign Application Priority Data

Oct. 22, 1971 Austria .............................. 9151/71

[52] U.S. Cl. .............................................. 242/191
[51] Int. Cl. .......................................... G11b 15/32
[58] Field of Search .......... 242/191, 190, 186, 201, 242/202, 204, 75.51

[56] References Cited

UNITED STATES PATENTS

| | | | |
|---|---|---|---|
| 3,600,654 | 8/1971 | Yasutake | 242/191 |
| 3,634,744 | 1/1972 | Toensing | 242/191 |
| 3,730,453 | 5/1973 | Hotchkiss et al. | 242/186 |

*Primary Examiner*—George F. Mautz
*Attorney, Agent, or Firm*—Frank R. Trifari

[57] ABSTRACT

The invention relates to a recording and/or playback apparatus in which a tape record carrier is adapted to be moved between two turntables in the fast-forward/rewind function. According to the direction of tape travel a motor is associated with the instantaneous take-up turntable and a tacho-generator is associated with the instantaneous supply turntable. During the fast-forward/rewind function the speed of the instantaneous take-up motor can be controlled via a control circuit which is supplied by the tacho-generator which cooperates with the instantaneous supply turntable in a manner such that the speed of the instantaneous supply turntable is constant, so that when the end of the record carrier is reached an undesirable high speed thereof is avoided. Furthermore, the control arrangement may also, after being suitably changed-over, be used to stop the record carrier in the fast-forward/rewind function in that it supplies a variable braking current to the motor to be stopped.

3 Claims, 4 Drawing Figures

RECORDING AND/OR PLAYBACK APPARATUS

Figure 1:
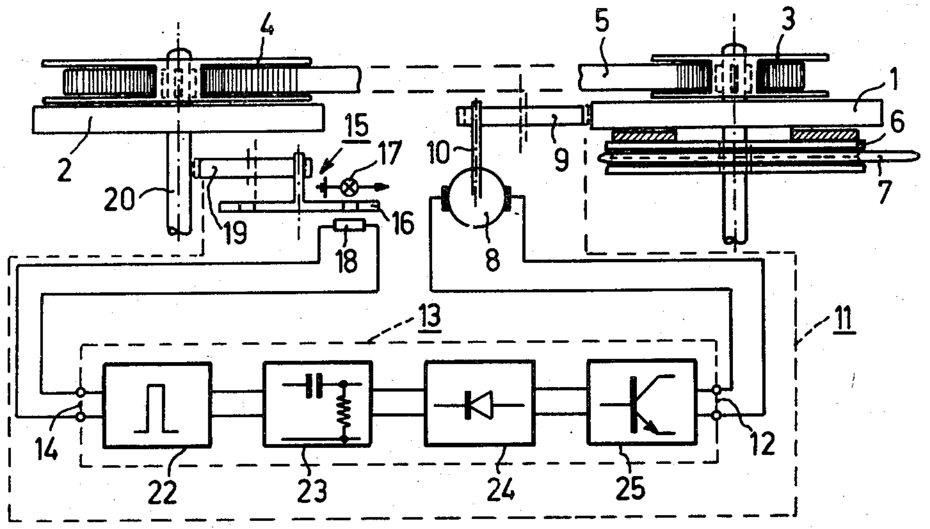

The invention relates to a recording and/or playback apparatus having two turntables on which reel hubs may be placed between which a tape-shaped record carrier can be transported, one of the turntables can be driven by a motor to take-up the record carrier. The speed of the motor is controllable in that it forms part of a control circuit which includes a control arrangement to the output of which is connected the motor and to the input of which is connected a tacho-generator which is driven when the record carrier is transported. The control signal produced by the tacho-generator and the operating point of the control arrangement together provides a control quantity which determines the motor speed. In such an apparatus described in German Published Patent Application No. 1,231,452 the control arrangement which maintains the speed of the tacho-generator constant at a given value serves to drive the record carrier, hereinafter for brevity referred to as tape, at a constant speed in the function "normal transport," the tachogenerator being directly driven by the tape which is transported past the magnetic heads of the apparatus in that the tape runs over a roller mounted on the tacho-generator shaft. The object of this arrangement is to drive the tape at a constant speed.

It is an object of the invention to provide a driving mode for driving the tape in the fast forward/rewind function which even at the associated high tape speed does not provide difficulty with respect to excessive tape stresses or the breaking of the tape when the end of the tape on the hub is reached. In known driving modes for fast forward/rewind of the tape the turntable by which the tape is taken up, hereinafter for brevity referred to as take-up turntable, is driven at a constant speed, with the result that the tape speed steadily increases as the diameter of the reel on the take-up turntable increases. Consequently, the highest tape speed occurs at the end of a rewind operation at the instant at which the end of the tape on the turntable from which the tape is unwound, hereinafter for brevity referred to as supply turntable, is reached. A high tape speed at the instant at which the tape end is reached gives rise to various difficulties. For example, in the case of tapes accommodated in cassettes one of the tape ends is undetachably secured to a hub, so that when the rewind operation is not terminated before the tape end is reached, the tape is jerked when no more tape can be unwound from the supply turntable, with the consequent likelihood of the tape snapping. However, even when the tape end is detachably attached to a hub, as generally is the case when reels are used, a high tape speed at the instant at which the tape end is reached gives rise, for example, to the difficulty that the tape is to be braked at a very rapid rate if at a stop shortly before the tape end the tape is to be prevented from entirely running off from the respective hub. Conditions will become more critical in proportion as the difference in diameter between the empty hub and a full reel is greater.

In an apparatus of the type defined at the beginning of this specification the invention eliminates these difficulties, or at least reduces them to a controllable value, in a simple manner in that when the tape is driven in the fast forward/rewind function the tacho-generator is driven by the supply turntable. This ensures that in the fast forward/rewind function the speed of the supply turntable is maintained constant while the take-up turntable is driven at a speed which varies continuously, in this case is continuously reduced. As a result, during a fast forward/rewind function, the tape speed decreases continuously and hence is at a minimum at the instant at which the tape end is reached. Thus the aforementioned difficulties can in any case more readily be controlled.

In an apparatus in which each turntable is driven by an associated motor it has proved to be advantageous for each turntable to be associated with a tacho-generator, provision being made of at least one control circuit and a change-over device which enables a control circuit to be completed, according to the direction in which the tape is moved in the fast forward or fast rewind function, which circuit includes the tacho-generator of the supply turntable and the motor of the take-up turntable. This enables the fast forward and fast rewind functions to be performed in accordance with the method according to the invention by a simple electric switching operation.

The driving arrangement according to the invention may also be simply used for stopping the tape if a switching device is provided which when operated renders operative a control circuit at least for the motor associated with the supply turntable, in which circuit this motor is connected to the output of a control arrangement the control quantity of which produces a torque opposite to the instantaneous direction of rotation of the motor and the input of which is connected to one of the two tacho-generators which applies to the control arrangement a control signal which tends to increase the control quantity and switches the control arrangement to an operating point at which it cuts off the supply of energy to the motor connected to its output as soon as the control signal applied to its input reaches a value which corresponds to stand still of the tacho-generator. These provisions ensure positive braking with extremely short braking times. It should be mentioned that Published German Patent Application No. 1.224.969 describes a stopping device for a tape drive comprising two mechanically coupled electric motors, the polarities of which may be reversed, in which device the initiation of the stopping operation causes one of the two motors to be reversed and to act as a braking motor, whilst simultaneously the other motor is disconnected from the current supply and connected as a tacho-generator the current of which when passing through zero at the instant at which the tape stops causes the braking current to be switched off. As will be appreciated, such a stopping device produces a constant braking force for the motor to be braked, whereas according to the aforedescribed provisions according to the invention a control circuit determines the current for the motor to be braked during the braking operation also, so that the braking operation proceeds continuously at a rate which matches the instantaneous tape speed and hence the stress to which the tape is subjected remains within appropriate limits even during a fast braking operation.

It has been found to be particularly advantageous for the motor associated with a turntable and the tacho-generator to be in the form of a single motor which can be connected into a control circuit either as a motor or as a tacho-generator. This results in a comparatively simple structure of the apparatus, because each turntable requires only one motor.

Furthermore it has been found to be of advantage for two control arrangements to be provided and two control circuits, each for a single motor, to be rendered operative on operation of the switching device, whilst in the control circuit for the motor associated with the take-up turntable the control quantity produces a torque opposite to the instantaneous direction of rotation of this motor, which is smaller than that produced by the control quantity in the control circuit for the motor associated with the supply turntable. Since the motors of both turntables are braked, the tape stress produced during braking is considerably further reduced.

Figure 2:
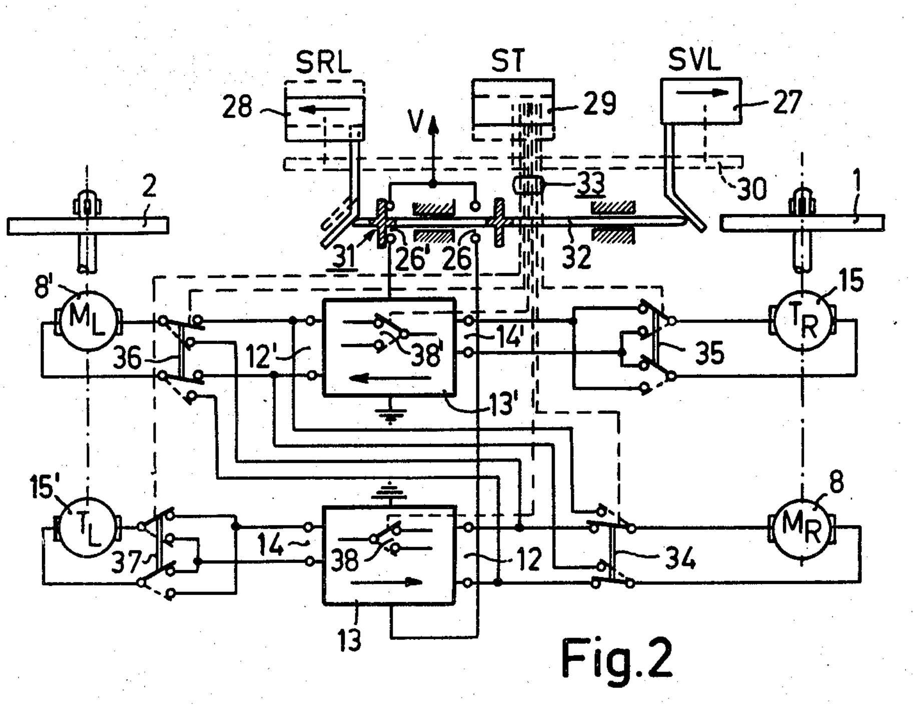
Figure 3:
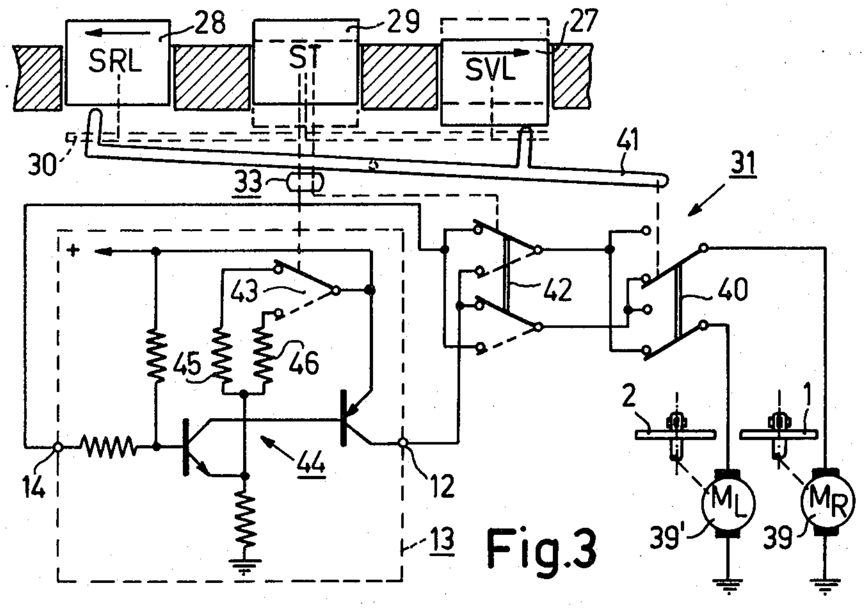
Figure 4:
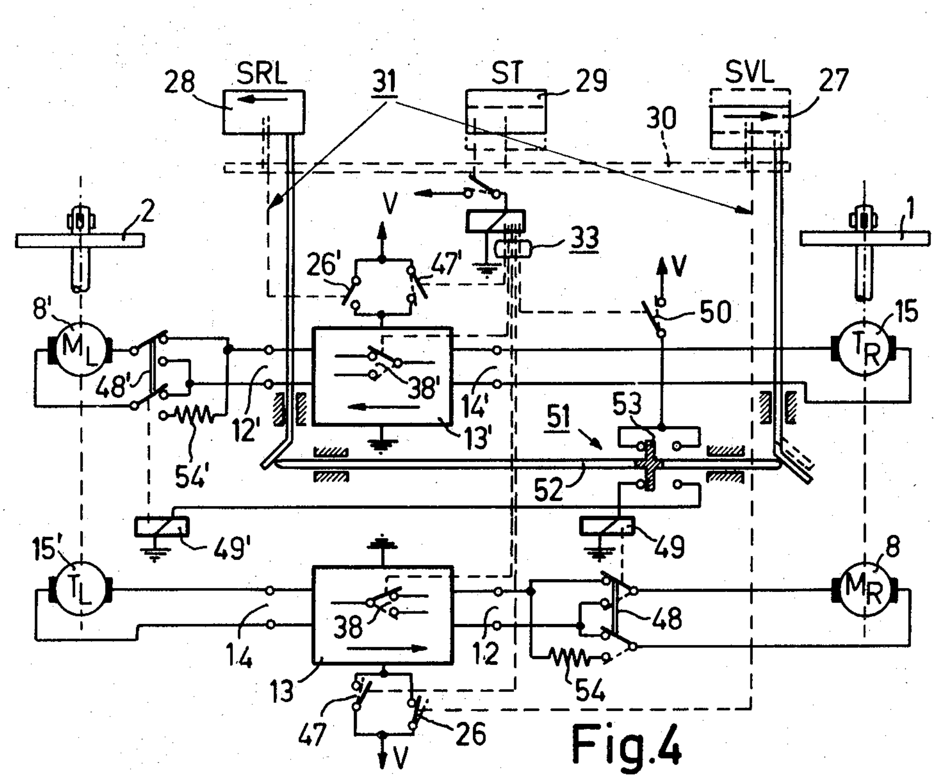

Embodiments of the invention will now be described, by way of example, with reference to the accompanying diagrammatic drawings, in which:

FIG. 1 shows an embodiment which uses only one motor and one tacho-generator which each may be mechanically coupled to either turntable, FIG. 2 shows an embodiment including a device for stopping the tape in which each turntable has an associated motor and an associated tacho-generator, FIG. 3 shows an embodiment in which the motor associated with a turntable may also be used as a tacho-generator, and FIG. 4 shows an embodiment in which in order to stop the tape both turntables are braked.

Referring now to FIG. 1, reference numerals 1 and 2 denote turntables on which are placed hubs 3 and 4 between which a tape 5 runs. Obviously the hubs and the tape may alternatively be accomodated in a cassette. For the normal play-record function, the turntable 1 serves as the take-up turntable and the turntable 2 as the supply turntable. In the play-record function, the tape is driven by means of a friction clutch disc 6 which may be driven via a belt 7 by, for example, a flywheel, not shown. For fast transport of the tape, in this case the fast forward function, a separate motor 8 is provided which can directly be coupled to the turntable 1 by an idler wheel 9 which for this purpose may be engaged between a motor shaft 10 and the turntable 1.

To control the speed of the motor 8 the latter is connected in a control circuit 11 which includes a control arrangement 13 and the output 12 of which is connected to the motor and the input 14 of which is connected to a tacho-generator 15. The tacho-generator 15 comprises an apertured disc 16 on one side of which a lamp 17 is disposed while on the other side there is arranged a photo-sensitive element 18 which is connected to the input 14 of the control arrangement 13. The apertured disc 16 can be driven via an idler wheel 19 by a spindle 20 of the supply turntable 2, for which prupose this wheel may be engaged between the spindle 20 and the spindle of the apertured disc when the apparatus is switched to the fast forward function. Thus, the tacho-generator 15 provides a control signal which is proportional to the speed of the turntable 2, for in accordance with the speed of the disc the photo-sensitive element 18 delivers a pulse train the frequency of which is proportional to the speed. The control arrangement 13 in known manner includes a pulse shaper 22 to which is connected a differentiator 23 which is connected to a rectifier stage 24 at the output of which a direct voltage is produced which is proportional to the speed of the turntable 2 and is applied to a control element 25 in the form of a direct-current transistor amplifier the output of which forms the output 12 of the control arrangement and by which there is supplied to the motor 8, in the present case a direct-current motor, a control quantity in the form of a direct current which determines the motor speed. As is known, such a control circuit tends to control the motor 8 so that the speed of the tacho-generator is constant. This desired speed is produced in the balanced condition of the control circuit; it is determined by the control signal and the operating point of the control circuit, which in the embodiment under consideration is mainly determined by the value of the direct voltage applied to the transistor amplifier and the quiescent current setting of the amplifier.

Because in the fast-forward function the tacho-generator is driven by the supply turntable 2, the control circuit causes the motor 8 and hence the take-up turntable 1 to rotate at a speed such as to result in a constant speed of the supply turntable 2, irrespective of the ratio between the diameters of the reels on the take-up hub 3 and the supply hub 4. From this it follows that during a fast-forward or rewind operation, the tape speed steadily decreases from a given initial value, because the diameter of the reel on the supply turntable which rotates at a constant speed is steadily decreased. Thus the tape speed is a minimum when the tape end is reached. A comparison between the aforedescribed fast-forward/rewind tape drive according to the invention with a known drive in which the take-up turntable is driven at a constant speed shows that at a given speed of the take-up and supply turntables and with a given amount of tape to be transported, the time required is the same in both methods, however, in the method in which the take-up turntable is driven at a constant speed the tape initially runs slowly and its velocity steadily increases, whereas in the method in which the supply turntable is driven at a constant speed the tape initially runs fast and its velocity is steadily reduced.

A low tape velocity at the end of a fast forward-/rewind function provides considerable advantages. If one only considers the stop operation, which may be initiated manually or automatically, it will readily be appreciated that it may be performed with increased simplicity and security when the tape velocity is low. The method according to the invention furthermore provides appreciable advantages in the cases where the end of the tape is fixed to a hub, for if in such a case the tape end is reached at a high tape velocity a sharp jerk is produced in the tape as soon as the tape end is reached. To prevent this either it must be appropriately proportioned or the drive must be constructed so that the tape velocity is not excessive on reaching the tape end. From this it follows that in such a case the use of a driving mode in which the speed of the supply turntable is constant when compared with a mode in which the speed of the take-up turntable is constant, other things being equal, either provides a reduced tape stress or permits a higher tape velocity in the fast forward/rewind function. To illustrate the orders of magnitude involved it should be mentioned that even with small tape reels the ratio between the diameter of a full reel and the diameter of an empty hub is about 2:1, so that from the condition that the speeds of the two turntables should be in the same ratio as the diameters of the two reels it follows that the tape velocity at the instant at which the tape end is reached during fastforward/rewind in the method according to the invention is about one half of that produced in the other method, while, as has been mentioned hereinbefore, the time required is the same.

Obviously the aforedescribed embodiment may be modified in a variety of manners without departing from the spirit and scope of the invention. For example, the motor 8 may be an alternating-current motor. Furthermore, tacho-generators which operate in widely different manners may be used, for example, inductive pulse generators or direct-voltage generators. The same applies to the control arrangement, with the obvious understanding that appropriate cooperation of all the elements of the control circuit must be ensured. In this connection it should be mentioned that in the embodiment shown in FIG. 1 a fast tape transport in the reverse direction, i.e., from the turntable 1 to the turntable 2, is obtainable by causing the idler wheels 9 and 10 to engage the respective other turntable, i.e., the wheel 9 engaging the turntable 2 and the wheel 19 engaging the turntable 1.

In the embodiment shown in FIG. 2 each turntable 1 and 2 has both an associated direct-current motor 8 and 8' respectively and a tacho-generator 15 and 15' respectively which supplies a direct voltage. Furthermore two control arrangements 13 and 13' are provided which each form a control circuit from a tacho-generator to a motor. The construction of the control arrangement will be described with reference to the embodiment shown in FIG. 3. A control circuit is rendered operative by applying a supply voltage V to the respective control arrangement via a pair of contacts 26 and 26' respectively.

Keys 27, 28 and 29 which cooperate with a holding bar 30 are provided for switching the apparatus to the functions fast forward, fast rewind and stop respectively. When a key is operated it latches in the holding bar, another, latched key being released and restored to its inoperative position. The keys 27 and 28 actuate a change-over device 31 which comprises a slider 32 which is adapted to be set into either of two operative positions in which it interconnects either a pair of contacts 26 or a pair of contacts 26'. This slider is alternately moved from one operative position to the other by the keys 27 and 28; on operation of the key 29, however, it remains in the same operative position. Furthermore the key 29 is capable of actuating a switching device which is symbolically designated by 33 and enables change-over switches 34, 35, 36 and 37 and change-over switches 38 and 38' included in the control arrangements to be changed over.

The operation of the said switching devices will be described later. For the time being it is assumed that the switches adapted to be changed over by the switching device are in the positions shown in solid lines in FIG. 2. Thus the motor 8 is connected to the output of the control arrangement 13 to the input of which is connected the tacho-generator 15', whilst the motor 8' is connected to the output of the control arrangement 13' to the input of which is connected the tacho-generator 15. In this manner two control circuits are formed, the circuit including the control arrangement 13 being associated with the fast-forward function and that including the control arrangement 13' being associated with the fast-rewind function. Each control circuit operates in a manner similar to that described with reference to the embodiment shown in FIG. 1. In the condition shown in solid lines in FIG. 2 the apparatus is switched to the fast-rewind function, i.e., the key 28 is in the depressed position. The change-over device 31 keeps the pair of contacts 26' closed, so that the control arrangement 13' is operative; the control arrangement 13 is inoperative. Consequently the tachogenerator 15 driven by the turntable 1 controls, via the control arrangement 13', the motor 8' which drives the take-up turntable. If the apparatus were switched to fast forward, the change-over device 31 would similarly render operative the control circuit which comprises the tacho-generator 15', the control arrangement 13 and the motor 8.

The tape is stopped in that the motor associated with the instantaneous supply turntable is electronically braked in a controlled manner, a control arrangement applying to this motor a control quantity which causes a torque opposite to the instantaneous direction of rotation of the motor to be produced. Consequently, controlling this electric braking for either direction of movement of the tape requires a control circuit to be rendered operative for which purpose the switching device adapted to be operated by the stop key is provided. If the tape is to be stopped during the fast-rewind function, the turntable 1 must be bracked; in the fast-forward function the turntable 2 must be braked.

When a control circuit for controlling the braking operation is to be rendered operative, this is performed by the control arrangement which is operative in the instantaneous function, in that the slider 32 remains in its instantaneous position when the key 27 or 28 by which it has been displaced returns to its inoperative position when the stop key 29 is operated. In order to ensure that the respective control arrangement delivers a control quantity which produces a suitable torque in the motor to be braked, the arrangement must be supplied by a tacho-generator with a control signal which tends to increase the control quantity. In the embodiment under consideration the tacho-generator associated with the turntable to be braked is used in the respective control circuit for the braking operation. In this case the respective tacho-generator has already been connected to the input of the control arrangement which is operative during the braking operation. However, the polarity of the tacho-generator must also be reversed to ensure that the control arrangement is controlled in the direction of an increasing control quantity, because before the initiation of the braking operation this tacho-generator, for the purpose of controlling the motor associated with the other turntable at a constant speed, is connected to the control arrangement with a polarity which tends to reduce the control quantity in order to establish a balanced condition in the control circuit. This polarity reversal is effected by changeover switches 35 and 37. Furthermore the motor to be braked must be connected to the output of the operative control arrangement, in which connection attention must be paid to the fact that the control quantity of the control arrangement should drive the motor in the direction required for braking. In the present case the respective motor may simply be connected to the output of the control arrangement, because the control quantity of this arrangement causes the motor to run in a direction which corresponds to take-up of the tape, which direction is opposite to that required for unwinding and hence corresponds to braking. This connection of the motor to be braked to the output of the control arrangement is effected by change-over switches 34 and 36.

Finally, in performing a braking operation it should also be ensured that the operating point of the control arrangement is changed over, because for the purpose of providing the control quantity for controlling the fast-forward or fast-rewind function this point is selected so as to cause the motor supplied by the control arrangement to assume a predetermined speed. For braking, the control arrangement is changed over to an operating point in which the arrangement cuts off the supply of energy to the motor connected to its output as soon as the control signal applied to its input reaches a value which corresponds to a standstill of the tacho-generator. In FIG. 2 this change-over of the operating point is symbolically indicated by change-over switches 38 and 38'; an example of such a change-over of the operating point is described in detail with reference to the embodiment shown in FIG. 3.

Thus, when the stop key is operated the switching device 33 operates the change-over switches 34, 35, 36, 37, 38 and 38' so that they occupy the positions shown in broken lines in FIG. 2. As a result, two control circuits are rendered operate, one which extends from the tacho-generator 15 via the control arrangement 13' to the motor 8 and the other which extends from the tacho-generator 15' via the control arrangement 13 to the motor 8'. Because owing to the pair of contacts 26' being closed the control arrangement 13' only is operative, only the control circuit which includes this control arrangement is operative. Hence the motor 8 is braked, which cooperates with the turntable 1, which in the fast rewind function is the supply turntable. In the fast forward function the stop key when operated renders the other control circuit operative, causing the motor 8' to be braked.

As practice has shown, such stop devices provided with control circuits operate fast and reliably. Obviously the aforedescribed stopping device may also be used to stop the tape in the play-record function. Furthermore a control circuit for braking a motor may comprise a wide variety of combinations of the two tacho-generators and the two control arrangements together with the respective motor, the only requirement being that the polarity of the control signal and of the control quantity should be suitably chosen.

The embodiment shown in FIG. 3 is distinguished by its great simplicity. In this embodiment the motor and the tacho-generator associated with a turntable is in the form of a single motor 39 and 39' respectively which may be used either as a motor or as a tacho-generator. Furthermore a single control arrangement 13 is provided. The separate control circuits are rendered operative in that the two motors are suitably connected, one to the input and the other to the output of the control arrangement. For the sake of simplicity direct-current motors are used.

The change-over device 31 comprises a double-pole switch 40 which is operated by a rocker 41 which is rocked by the key 27 or the key 28 for switching the apparatus to fast-forward and to fast-rewind respectively. In FIG. 3 the apparatus is in the fast-forward function.

The switching device 33 for stopping the tape comprises a double-pole two-way switch 42 and a single-pole two-way switch 43 for changing over the operating point of the control arrangement 13.

Each moving contact of the change-over switch 40 is connected to one of the two motors 39 and 39' respectively, whereas the moving contacts of the change-over switch 42 are cross-coupled to the outputs of the switch 40. The input 14 and the output 12 of the control arrangement are cross-connected to the outputs of the switch 42. Thus always alternately one motor may be connected to the input and the other to the output of the control arrangement for creating the control circuits.

The control arrangement comprises a two-stage direct-current amplifier, because the control signal provided by a motor acting as a tacho-generator is a direct current and hence the control quantity for a motor also must be a direct current. The operating point of the control arrangement is fixed by a voltage divider 44 which applies a given bias voltage to the first amplifier stage. The value of this bias voltage may be varied by means of the switch 43 which connects into circuit either a resistor 45 or a resistor 46 in the voltage divider.

When the control arrangement forms part of a fast-forward/rewind control circuits, the voltage divider is chosen so that the amplifier carries a given quiescent current in the absence of a control signal at its input. When a control signal appears it reduces the quiescent current until a balanced condition is established, in which case the tacho-generator and hence the turntable cooperating with it have the desired speed.

If, however, the control arrangement forms part of a control circuit for a braking operation, the voltage divider is chosen so that the amplifier passes no current when there is no, or a very small, control signal, in which case the control arrangement provides no control quantity, which means that the supply of energy to the motor connected to its output is cut off.

Thus, in the case of the fast-forward function the motor 39', which acts as a tacho-generator and cooperates with the supply turn table, is connected to the input 14, whilst the motor 39, which cooperates with the take-up turntable, is connected to the output 12 of the control arrangement. The motor 39', according to the present embodiment in its role as tacho-generator, then supplies a negative control signal, because it is rotated in a direction opposite to its take-up direction, whereas a positive control quantity is applied to the motor 39, causing it to rotate in its take-up direction.

In this manner the control circuit again ensures that in the fast-forward/rewind function the supply turntable has a constant speed.

If now the stop key 29 is depressed, the doublepole two-way switch 42 causes the motor 39 in the role of the tacho-generator to be connected to the input of the control arrangement and the motor 39' to be connected to the output of the control arrangement. Because the motor 39 continues to rotate in the same direction, it now applies a positive control signal to the control arrangement, with the result that this arrangement applies a very large positive control quantity to the motor 39'. Such a control quantity, however, tends to drive the motor in a direction opposite to its instantaneous direction, i.e., it brakes the motor. This continues until the motor 39 is stationary, in which case it no longer supplies a control signal, with the result that the control arrangement, which has been changed over in its operating point by the two-way switch 43, cuts off the supply of energy to the motor 39'. This terminates the braking operation.

The embodiment shown in FIG. 4 is an extended version of the embodiments shown in FIG. 2 and in the fast-forward/rewind functions operates exactly in the same manner. For stopping the tape, however, in the embodiment shown in FIG. 4 both turntables 1 and 2 are braked in that two control circuits are rendered operative. To prevent looping, the supply turntable must be braked more strongly than the take-up turntable. Braking both turntables provides the advantage that during the braking operation the tape tension is smaller than when the supply turntable only is braked, because the tape is subjected to the difference of the braking torques only.

The switch positions shown in solid lines in FIG. 4 correspond to the fast-forward function. The control arrangement 13 is operative and the control circuit for the fast-forward function extends from the tacho-generator 15' to the motor 8. If now the stop key 29 is depressed, both control arrangements are rendered operative via the switching device 33 by closure of the switches 47 and 47' and are changed over in their operating points by operation of the change-over switches 38 and 38' for controlling a braking operation. The control arrangement 13' forms part of the control circuit which extends from the tacho-generator 15 to the motor 8', so that this motor and hence the supply turntable 2 are braked, in a manner similar to that described with reference to the embodiment shown in FIG. 3. The second control circuit for braking the take-up turntable 1 extends from the tacho-generator 15' via the control circuit 13 to the motor 8. This motor 8 rotates in the take-up direction, so that for braking it is to be supplied with a control quantity which tends to drive it in the other direction, i.e., it must be connected to the output 12 of the control arrangement 13 with reversed polarity.

This polarity reversal of that motor which was driven before the braking operation is effected by the switching device 33. For this purpose each motor circuit includes a reversing switch 48 and 48' respectively which is controlled by a relay 49 and 49' respectively. The switching device completes the circuit for one of the two relays by means of a switch 50, the choice of the relay to be energized being made by a storage device 51, because that motor only which before the braking operation was driven in the fast-forward/rewind function is to be reversed. For making this choice the storage device 51 has a slider 52 which is switched between two operative positions by the keys 27 and 28 so as to select, via a contact piece 53, either the circuit for the relay 49 or that for the relay 49'.

In the present case the relay 49 is energized, causing the motor 8 to be reversed in polarity via the reversing switch 48. The reverse polarity circuit for the motor includes a resistor 54 which reduces the control quantity applied to the motor by the control arrangement. Thus the motor 8 is braked with less force than is the motor 8'. Braking the tape in the fast-rewind function is performed in a completely similar manner.

Obviously many modifications of the aforedescribed embodiments are possible without departing from the spirit and scope of the invention.

What is claimed is:

1. A recording and/or playback apparatus comprising two turntables for carrying thereon tape reels to transport magnetic tape therebetween, a motor connected to each turntable for driving same to take-up the tape on its respective turntable, means for energizing said motors said that one of said motors operates its turntable as a tape take-up turntable and the other turntable operates as a tape supply turntable when the tape is traveling in one direction and vice versa when the tape is traveling in the opposite direction, a tacho-generator connected to each turntable for producing a control signal proportional to the speed of its respective turntable, at least one control arrangement providing a control quantity to determine the speed of the motor operating the take-up turntable, change-over means for establishing a control circuit in accordance with the direction of the tape transport, said control circuit including the tacho-generator of the supply turntable connected to the input side of said control arrangement, and the motor of the take-up turntable connected to the output of said control arrangement so that the control signal of the tacho-generator of said established control circuit and an operating point of said control arrangement provides said control quantity to determine the speed of the motor in said established control circuit, and switching means for stopping tape travel connecting the motor of the supply turntable to the output of a control arrangement which produces a control quantity for providing a torque on said supply motor in a direction opposite to the instantaneous direction of rotation of said motor, and connecting one of said tacho-generators to the input of said control arrangement, the control signal of which is applied to said control arrangement for increasing the control quantity provided thereby, and a change over switch operated by said switch means for changing over said control arrangement to an operating point at which it cuts off supply energy to the motor connected to its output when the control signal applied to its input reaches a value which corresponds to standstill of the tacho-generator producing said signal, thereby stopping tape travel.

2. The apparatus according to claim 1 wherein said motor and tacho-generator of each turntable is a single motor which may be included in a control circuit either as a motor or as a tacho-generator.

3. The apparatus according to claim 1 wherein two control arrangements are provided, said switching means rendering two control circuits operative for controlling each of said motors, and wherein the control quantity of the control circuit for controlling the motor associated with the take-up turntable produces a torque which is opposite to the instantaneous direction of rotation of said take-up motor and smaller than the torque produced by the control quantity of the control circuit for the motor associated with the supply turntable.

* * * * *

PO-1050
(5/69)

UNITED STATES PATENT OFFICE
CERTIFICATE OF CORRECTION

Patent No. 3854676 Dated December 17, 1974

Inventor(s) WALTER FISCHER and HERBERT RUTKOWSKI

It is certified that error appears in the above-identified patent and that said Letters Patent are hereby corrected as shown below:

In the heading, Austrian priority application No.

should be --A 9151/71--

Signed and sealed this 20th day of May 1975.

(SEAL)
Attest:

RUTH C. MASON
Attesting Officer

C. MARSHALL DANN
Commissioner of Patents
and Trademarks